United States Patent [19]

Kaaden

[11] Patent Number: 4,769,951
[45] Date of Patent: Sep. 13, 1988

[54] DOOR MADE OF PLASTIC MATERIAL FOR MOTOR VEHICLES

[76] Inventor: Hans-Heinrich Kaaden, Up de Ring 12, 2944 Wittmund 2, Fed. Rep. of Germany

[21] Appl. No.: 843,693
[22] PCT Filed: May 31, 1985
[86] PCT No.: PCT/DE85/00188
 § 371 Date: Jan. 21, 1986
 § 102(e) Date: Jan. 21, 1986
[87] PCT Pub. No.: WO85/05599
 PCT Pub. Date: Dec. 19, 1985

[30] Foreign Application Priority Data

Jun. 4, 1984 [DE] Fed. Rep. of Germany ....... 3420744
Jun. 28, 1984 [DE] Fed. Rep. of Germany ....... 3423827

[51] Int. Cl.⁴ .................................................. B60J 5/04
[52] U.S. Cl. ..................................... 49/502; 296/146
[58] Field of Search ................... 49/502, 501; 296/146

[56] References Cited

U.S. PATENT DOCUMENTS 4,365,443 12/1982 Miara ................................... 49/502

FOREIGN PATENT DOCUMENTS 703137 3/1941 Fed. Rep. of Germany .
2014805 1/1971 Fed. Rep. of Germany .
3104681 12/1981 Fed. Rep. of Germany .
3126065 1/1983 Fed. Rep. of Germany .
1168892 12/1958 France .
1597263 6/1970 France .
2416809 9/1979 France .
0015201 9/1980 France .

Primary Examiner—Kenneth J. Dorner
Assistant Examiner—Gerald A. Anderson
Attorney, Agent, or Firm—Collard, Roe & Galgano

[57] ABSTRACT

There is provided a door for motor vehicles formed of plastic material, the parts of which are substantially manufactured by injection molding. The door consists of a center single piece support construction for transmitting forces to the frame of the motor vehicle body, an outer door shell secured on the support construction and an inner door shell. The support construction is formed by a profiled frame provided with stiffening elements extending throughout the door and a reinforcement arranged beneath the window opening. The profiled frame is a steplessly changing profile having stiffening elements formed by injected stiffening ribs, and the reinforcement arranged beneath the window opening is injected in the profiled frame and consists of horizontally extending load profiles and vertically extending ribs forming a lattice construction.

34 Claims, 4 Drawing Sheets

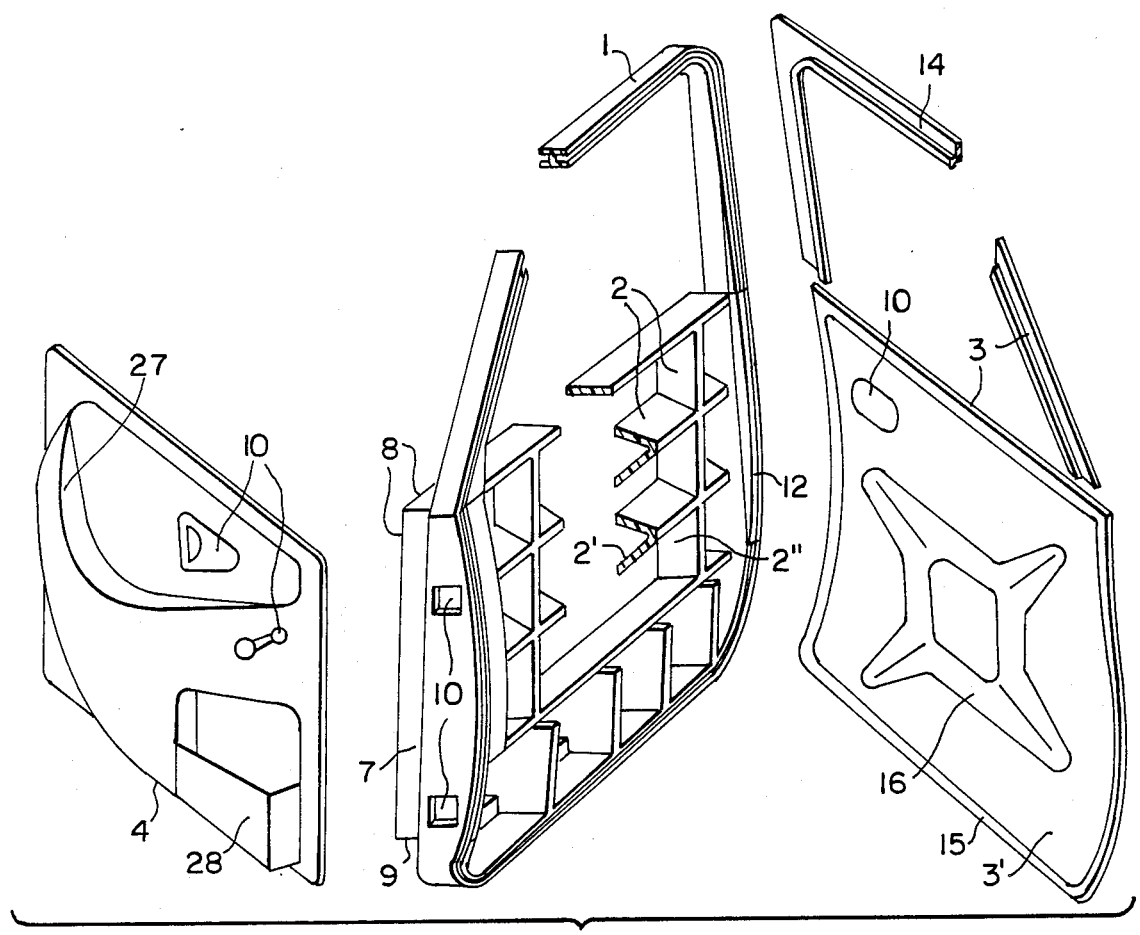
Fig. 1
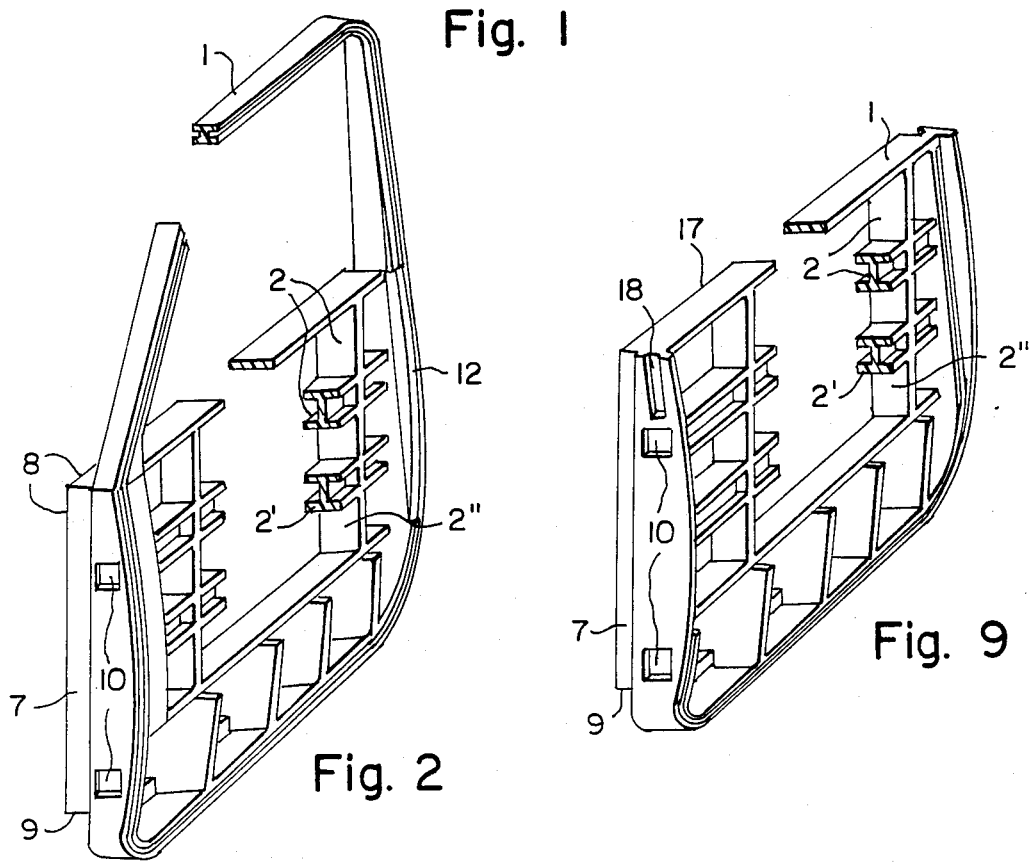
Fig. 2
Fig. 9

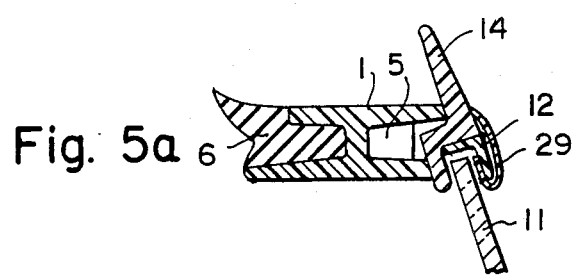
Fig. 5a
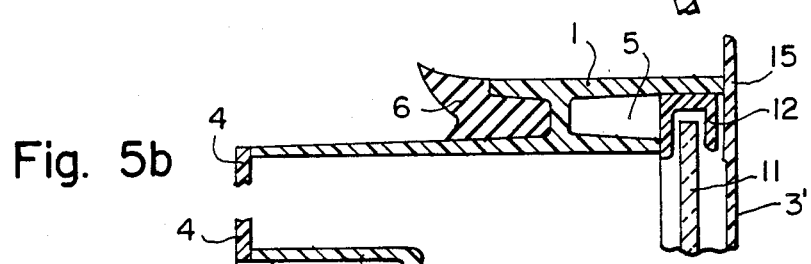
Fig. 5b
Fig. 5c
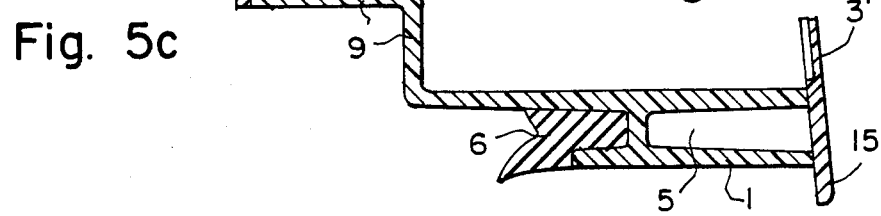
Fig. 6a
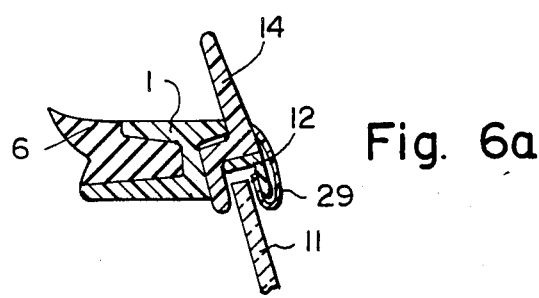
Fig. 6b
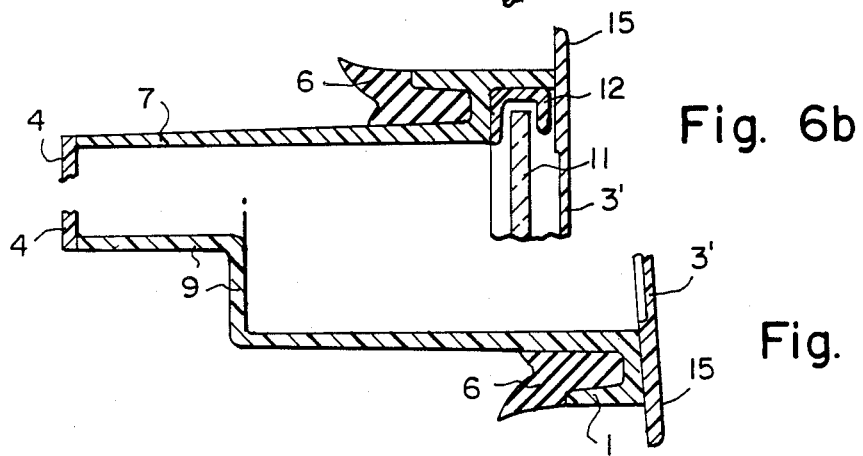
Fig. 6c

DOOR MADE OF PLASTIC MATERIAL FOR MOTOR VEHICLES

BACKGROUND OF THE INVENTION

1. Field of the Invention

The invention relates to a door made of plastic material for motor vehicles, with a stiffening suitable for receiving the outer and inner shells of the door, said stiffening transmitting the forces occurring into the frame of the body of the vehicle.

2. Description of the Prior Art

Indisputably, the side door is a highly complicated component of the body of a motor vehicle. The door has to have exceptionally high strength and is expected to function even after a collision accident.

Generally, a door made of steel sheet satisfies said requirements. Efforts made to reduce the weight have resulted in door designs comprising a plastic outer shell of the door and a plastic inner shell of the door applied to a stiffening construction consisting of steel profiles or sections. The forces acting on such a construction are transmitted into the frame of the auto body by the stiffening construction consisting of steel sections. With a known design, the outer and inner shells are manufactured by deep-drawing and combined with each other.

Said doors represent a combination of different materials; however, such doors do not meet the requirements in automobile construction particularly with respect to safety.

Now, the present invention is based on the problem of further reducing the weight of a plastic door for motor vehicles and to construct such a door in such a way that it will fully satisfy all requirements without a stiffening construction made of steel sections while still having substantial safety reserves.

SUMMARY OF THE INVENTION

According to the invention, said problem is solved in that the stiffening designed as a supporting construction, the outer shell of the door and the inner shell of the door are formed by prefabricated plastic parts capable of being joined together and produced mainly by injection molding, whereby the supporting construction may be formed by a profiled frame extending all around and having a reinforcement injection-molded beneath the window opening. Advantageously, the reinforcement injected in the profiled frame is formed by horizontally extending load profiles and vertically extending ribs in the form of a latticework construction. Said load profiles may have any desired shape; however, advantageously, they have the shape of a "V", double "T" or "I" beam, or "U".

Said design provides a frame construction with torsional rigidity. The load profiles permit the transmission of forces between the hinges and the zone of the locking mechanism.

In accidents, the load profiles are kept in their horizontal position by the vertically extending ribs. The latticework formed by the horizontally extending load profiles and vertically extending ribs represents a safety cell by which forces occurring in accidents are transmitted into the metal frame of the body of the vehicle.

According to another feature of the invention, the profiled frame has a cross section with the shape of a double "T" or "U". Stiffening ribs extending parallel to the flanges are injected on both sides of the crosspiece of the double T-shaped profiled frame and on the crosspiece of the U-shaped profiled frame. Said stiffening ribs serve primarily for stiffening the profiled frame.

According to another feature of the invention, the outer shell of the door has an areal stiffening disposed on the inside of the shell, usefully, said stiffening has an asymmetric star shape with different wall thicknesses. Advantageously, the outer side of the window pane is disposed approximately on one plane with the window facing and outer shell of the door. In this way, a low drag value is achieved within the zone of the window of the door and wind noise is largely avoided.

The invention provides a fully plastic door for motor vehicles that is produced mainly by injection molding. Said door offers a significant weight reduction and it meets or largely exceeds the safety requirements given for such doors. By using a high-quality plastic door made by injection molding it is possible for the first time in auto body construction for the auto industry to construct the passenger cell as a genuine safety cell also as far as the sides are concerned. A static flexural load of 3,000 kg is the requirement and standard with respect to the strength values of current door constructions made of auto body sheet.

The plastic door with the design of the invention, which is manufactured primarily by injection molding from high-quality thermoplastics, is capable of withstanding a static flexural load in the range of 6,000 and 9,000 kg depending on the dimensions of the load profiles. This means that said plastic door assures a lateral construction of the passenger cell with high torsional rigidity. Thus a notable gain in safety is obtained as compared to conventional door constructions particularly in dangerous rear-and-front-end collisions. However, even other plastics such as, for example, duroplastics or elastomers may be used partially for manufacturing the door, especially for producing the shells.

With the plastic door, stresses or loads are transmitted in two stages: in minor accidents, the transmission of such stresses takes place between the hinges and the lock mechanism. In major accidents, the profiled frame of the door-supporting construction is additionally forced into the metal frame of the vehicle skeleton without impairing the function of the door, which is very important in view of the fact that it must always be possible to open the door. Embodiments of the invention are shown in the drawing and explained in greater detail hereinafter.

BRIEF DESCRIPTION OF THE DRAWING

In the drawing,

FIG. 1 shows a perspective view of a profiled frame with a latticework construction injection-molded therein, an outer shell of the door and an inner shell of the door partially shown in a sectional view prior to the assembly of said parts;

FIG. 2 is a perspective view of a variation of a profiled frame with a latticework construction injection-molded therein;

FIGS. 5a to 5c are sectional views of a variation based on FIGS. 3a to 3c;

FIGS. 6a to 6c show sectional views of a variation based on FIGS. 4a to 4c;

FIG. 9 is a perspective view of a lower main part of the supporting construction;

DESCRIPTION OF THE PREFERRED EMBODIMENTS

Figure 3A:
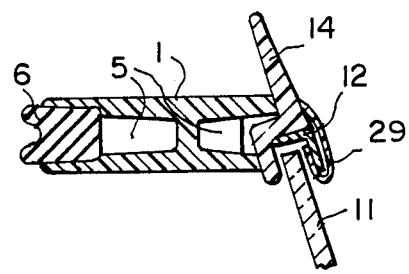
FIG. 3a is a sectional view of a T-shaped profiled frame within the zone of the window with a connected window facing including the window pane, as well as a glued-in window sealing strip.

FIG. 1 shows that a reinforcement 2 in the form of a latticework construction is molded by injection in a profiled frame 1 having a cross section with the shape of double "T" and extending all around. Said reinforcement is formed by the horizontally extending load profiles 2' and the vertically extending ribs 2". Said load profiles 2' may have any desired shape. In FIG. 1, the load profiles 2' have a V-shaped section, and FIG. 2 shows load profiles with a cross section in the shape of a double "T" or "I" beam. The profiled frame 1 provides a frame construction with torsional rigidity forming with the reinforcment 2 the supporting construction of the door, which door is to be viewed as a door and safety cell. For enhancing the rigidity, the double "T" or "I" beam-shaped profiled frame 1 has the stiffening ribs 5 extending parallel to the flanges. Said ribs are injection-molded on both sides of the crosspiece and arranged with a uniform spacing between each other.

The outer side of the latticework construction 2' and 2" is recessed for guiding the window pane 11. The vertical ribs 2", below the zone of the window pane, extend down to the inner surface of the outer shell 3 of the door. For guiding the window pane 11 laterally, the guide strips 12 are arranged on the outwardly facing side of the latticework construction 2' and 2". Said strips 12 are made of plastic, too, and secured by glueing. According to FIG. 1, the outer shell 3 of the door is formed by a window facing 14, said facing having a Z-shaped cross section and being divided in the horizontal direction. An areal stiffening 16 having the asymmetric shape of a star is disposed on the inner side of the outer door facing 3', said stiffening 16 having different wall thicknesses. On the inner side, the latticework construction 2' and 2" projects beyond the profiled frame. The inner legs 7 of said profiled frame are extended horizontally and vertically in the lower part of the supporting construction 1+2, forming a frame 8 on the inner side. Also, on the inner side, the latticework construction 2' and 2" and the profiled frame 1 may extend flush. Within the bottom zone, the frame 8 has the inwardly stepped steps 9.

The inner door facing 4 has a shaped cushion with a large rebound area which, in accidents, acts as an impact-reducing element. Said effect is increased by rubber buffers disposed between the rib constructions of the inner shell 4 of the door and the supporting construction 1+2. The arm rest 27 is integrated in the inner door facing 4. The lock, handle and crank parts are arranged recessed for reasons of reducing the hazard of injury. If they are not arranged recessed, said parts are provided with an adequate rebound area. The inner shell 4 of the door is usefully covered with a textile material.

The supporting construction formed by the profiled frame 1 and the reinforcement 2, the latter in turn being formed by the load profiles 2' and the vertical ribs 2" forming a latticework construction, can be prefabricated. Said supporting construction and the outer shell 3 and the inner shell 4 of the door are manufactured by injection molding from high-quality modified thermoplastics. In terms of molding technology, the injection molding process offers nearly unlimited shaping possibilities, so that any type of shape can be produced per se. The positions for installing the hinges, locks, centering devices and mirrors are injection-molded ready for the installation of said parts if possible in terms of molding techniques.

Figure 3B:
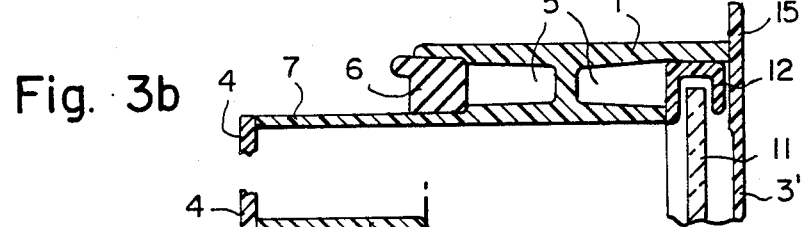
FIG. 3b shows the same parts as FIG. 3a, but with a cut view within the zone of the window pane well.
Figure 3C:
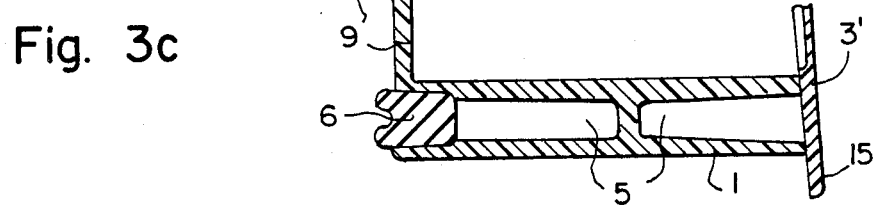
FIG. 3c shows the same as FIG. 3a, but with a cut through the bottom zone.

FIGS. 3a to 3c show a window facing 14 and an outer shell 3 arranged on different sectional panels on a T or "I" beam-shaped profiled frame 1. Within the zone of the window, the window facing 14, which has a Z-shaped section in said zone, accommodates a guide strip 12 having an angularly shaped section. Within the zone of the window pane well, the plastic guide strip 12 has a U-shaped section, and the outer door shell facing 3' has a plane profile 15 extending all around on the side facing the supporting construction 1+2. The outer door shell facing 3' is combined with the profiled frame 1 via said profile 15 by glueing or fusing. Said plane profile 15 is reinforced within the zone of connection. A door sealing strip 6 is glued into the inside of the profiled frame 1, extending all around and abutting the stiffening ribs 5 in a butt-joined connection. It is known that a decorative strip 29 is arranged on the window facing 14.

Figure 4A:
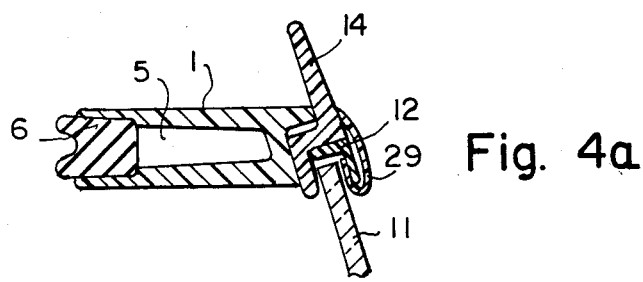
FIG. 4a is a sectional view of a U-shaped profiled frame within the zone of the window, with a connected window facing including the window pane and a glued-in door sealing strip.
Figure 4B:
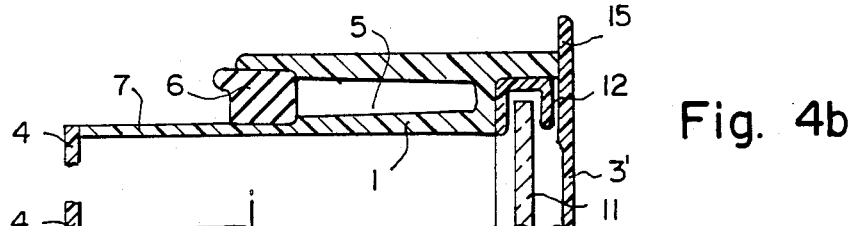
FIG. 4b shows the same parts as FIG. 4a, but with a section through the zone of the window pane well.
Figure 4C:
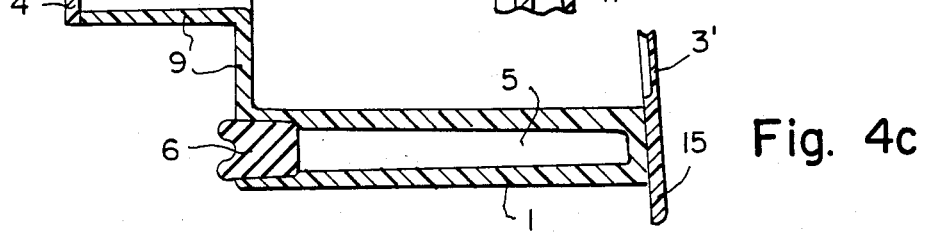
FIG. 4c shows the same as FIG. 4a, but with a cut through the bottom zone.
Figure 10:
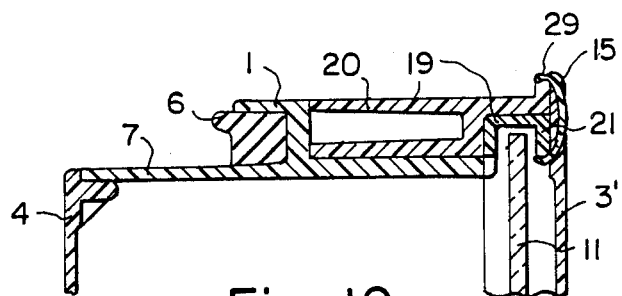
FIG. 10 shows a variation based on FIG. 4b with a separate plastic window frame.
Figure 7:
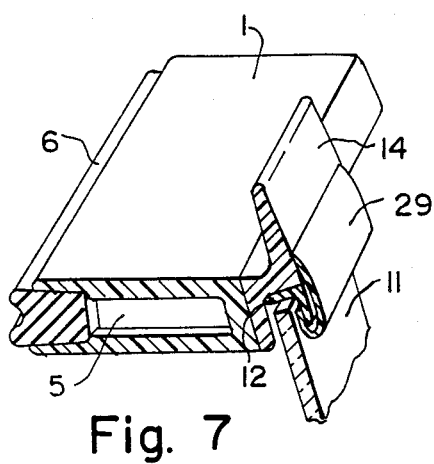
FIG. 7 is a perspective view of a variation based on FIG. 4a, with an especially large connection area between the window facing and profiled frame.

The FIGS. 4a to 4c show another variation of the sectional shape of the profiled frame 1 with the matching arrangement of a window facing 14 and an outer door facing 3'.

In this case also, stiffening ribs 5 are arranged in the U-shaped profiled frame 1. Instead of the guide strips 12 (plastic strips) shown in FIGS. 3 to 8 for laterally guiding the window pane 11, a U-shaped metal profile may be arranged for guiding the window pane.

With the variation shown in FIG. 9, a lower main part 17 of the supporting construction 1+2 is shown, said part being associated with the part containing the zone of the window. On the top outermost limitation of the main door part 17, a clearance 18 is provided in each case for receiving a window frame forming the part containing the zone of the window. Said window frame may be made of plastic material 19 or metal 19'. The connection between the window frame 19 or 19' and the plastic main door part 17 may be established in any desired way, advantageously by means of screwing the parts together.

The plastic window frame 19 has a supporting profile 20 and a profile 21 for guiding the window pane, said profile 21 having the shape of a "U" and being glued into the supporting profile 20.

Figure 11:
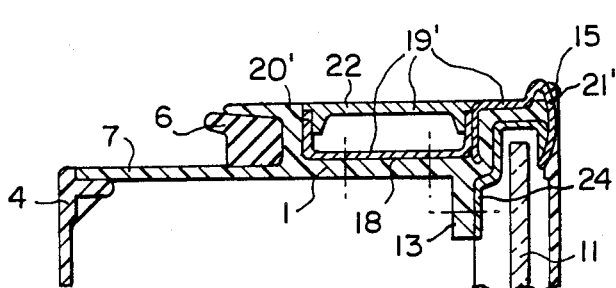
FIG. 11 is a variation based on FIG. 4b with a separate metal window frame.
Figure 8:
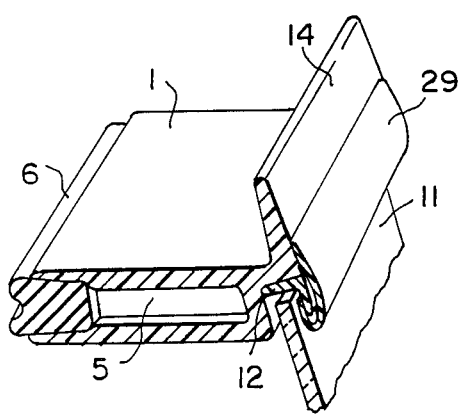
FIG. 8 is a perspective view of a variation based on FIG. 4a with a door facing on the profiled frame.
Figure 12:
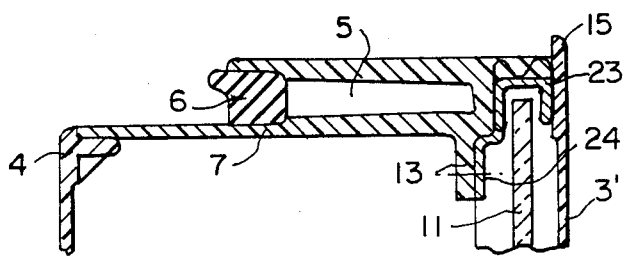
FIG. 12 shows a variation based on FIG. 4b, with a metal window frame representing another variation of 4b.

The metal window frame 19', according to FIG. 11, consists of a supporting profile 20' and a profile 21' for guiding the window pane, with said supporting profile 20' being covered by a plastic cover profile 22 extending all around.

Within the zone of the window and in the window well, the window pane may be guided by a common metal frame 23. For said purpose, the metal frame 23 has a U-shaped section in the zone of the window and additional installation legs 24 provided in the well of the window, said legs being screwed on the installation or mounting ribs 13 of the profiled frame 1.

Figure 13:
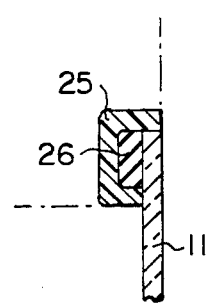
FIG. 13 shows a variation based on FIG. 4a for a door without a window frame.

According to FIG. 13, the door is designed frameless within the zone of the window. In this case, the window pane is guided on a plastic guiding profile 25 embedded in the frame of the door, as well as on a window-sealing strip 26 glued into the guiding profile 25.

The storage compartment 28 consists of plastic material and is usefully glued into the inner shell 4 of the door. FIG. 1 shows that all required installation positions 10 are arranged in the inner shell 4 of the outer facing 3' of the door and in the supporting constructions 1+2. The horizontal load profiles 2' and the vertically extending ribs 2" have reinforced and rounded ties provided on their joints and points of connection.

The plastic door according to the invention may be used for all types of motor vehicle, including its use as a hatch-type door.

In the present case, the door represents a typical group of components manufactured from high-quality chemical materials. By combining different chemical materials which are each selected for their specific properties, a light-weight door for auto bodies is provided which meets the most exacting safety requirements.

For the load part, i.e. the supporting construction, it is possible to select, for example, a modified thermoplastic material such as a modified type of polyamide 6 with or without filler. Especially high strength combined with high rigidity is required for the profiled load part, among other properties.

A mineral-filled duroplastic material or a modified thermoplastic in the form of a modified polybutylene teraphthalate (PBTP) with high impact strength is suitable, among other materials, for the outer shell of the door. In particular rigidity and good optical surface quality are required for said part A thermoplastic material such as, for example, polypropylene, or a PUR-material is suitable for the inner shell of the door. As a lining, said component has to assume also functions of interior or passive safety.

The development of highly valuable chemical materials is still under way. In plastic research, work is being performed especially for the development of "custom-made" polymer materials, which are noted for high mechanical and thermal stressability, special optical properties, their self-reinforcing nature (liquid crystals), and excellent resistance to chemicals, etc. Polymer blends with an attractive price-performance ratio will be available in the medium-term future and open up a new market on the body-building sector of the automobile industry.

Technological progress, cost optimization combined with superior quality, improvements of the manufacturing process for facilitating the production operation and reduction of the production cost are the requirements to be satisfied for the mass production of light-weight body parts made from chemical materials.

Stübbe, by developing a series of manufacturing machines for the mass production of auto body parts, has created a new technology for the construction of auto body parts from chemical materials that is meeting said requirements.

What is claimed is:

1. A motor vehicle door formed of plastic material whose parts are substantially manufactured by injection molding, said door consisting of a center single-piece support construction for transmitting forces to the frame of the body of the motor vehicle, an outer door shell and an inner door shell secured on said support construction, the support construction being formed of an outer profiled frame extending around the periphery of said door and being provided with stiffening elements and a reinforcement arranged beneath the window opening, the improvement comprising: said profiled frame having a steplessly changing profile cross section along the door periphery, the stiffening elements of said profiled frame being formed by injection molded stiffening ribs, and the reinforcement arranged beneath the window opening being injection molded in the profiled frame and consisting of horizontally extending load profiles and vertically extending ribs forming a lattice construction extending throughout the door beneath the window opening.

2. The door for motor vehicles as defined in claim 1, wherein the cross-section of the profiled frame has a "U" shape.

3. The door for motor vehicles as defined in claim 1, wherein the load profiles have a "U" shape.

4. The door for motor vehicles as defined in claim 1, wherein the load profiles have an "I" beam shape.

5. The door for motor vehicles as defined in claim 1, wherein the cross section of the profiled frame has an "I" beam shape.

6. The door for motor vehicles as defined in claim 1, wherein the stiffening ribs are arranged with equal spacing therebetween along said profiled frame.

7. The door for motor vehicles as defined in claim 1, wherein a door sealing strip is inserted in the profiled frame on an inner side of the door.

8. The door for motor vehicles as defined in claim 7, wherein the door sealing strip is secured by glueing, butt-joining the stiffening ribs.

9. The door for motor vehicles as defined in claim 1, wherein the load profiles have the shape of a "V".

10. The door for motor vehicles as defined in claim 1, wherein a lower zone of the door between the profiled frame and the lowermost, horizontally extending load profile, the vertical ribs extend directly up to the inner surfaces of the outer shell of the door.

11. The door for motor vehicles as defined in claim 1, wherein the horizontal load profiles and the vertically extending ribs project beyond the profiled frame at an inwardly facing side of the support construction.

12. The door for motor vehicles as defined in claim 1, which further comprises inner legs extending horizontally and vertically from said profiled frame in said door beneath said window opening so as to form a frame extending from an inside surface of said door.

13. The door for motor vehicles as defined in claim 12, wherein said frame extending from the inside surface of said door is stepped at the door bottom.

14. The door for motor vehicles as defined in claim 12, wherein said frame extending from the inside surface of said door is aligned flush with the horizontal load profiles and the vertically extending ribs.

15. The door for motor vehicles as defined in claim 1, wherein said profiled frame extends flush with the lattice construction of horizontally extending load profiles and vertically extending ribs.

16. The door for motor vehicles as defined in claim 1, wherein an outer side of the lattice construction of horizontally extending load profiled and vertically extending ribs is recesed for guiding a window pane.

17. The door for motor vehicles as defined in claim 1, wherein said outer shell of the door is formed by a window facing extending around the window opening and an outer door panel arranged beneath the window opening.

18. The door for motor vehicles as defined in claim 17, wherein the window facing has a Z-shaped cross section.

19. The door for motor vehicles as defined in claim 17, wherein the window facing is injection-molded on the profiled frame.

20. The door for motor vehicles as defined in claim 17, wherein a window pane is disposed substantially on the same plane with the window facing and the outer shell of the door.

21. The door for motor vehicles as defined in claim 17, wherein the outer panel of the door has a plane profile extending therearound on the side facing the supporting construction, said profile resting against the profiled frame and being connectable thereto.

22. The door for motor vehicles as defined in claim 21, wherein said plane profile of the outer panel of the door is reinforced in the zone of connection with the profiled frame.

23. The door for motor vehicles as defined in claim 21, wherein the plane profile of the outer shell of the door, said profile resting against the profiled frame, is connected with said frame by glueing or fusing.

24. The door for motor vehicles as defined in claim 21, wherein said outer door panel has an areal stiffening on an inside surface thereof.

25. The door for motor vehicles as defined in claim 24, wherein the areal stiffening has an asymmetric shape of a star.

26. The door for motor vehicles as defined in claim 24, wherein the areal stiffening has different wall thicknesses.

27. The door for motor vehicles as defined in claim 24, wherein the areal stiffening decreases steplessly from a center thereof outwardly.

28. The door for motor vehicles as defined in claim 1, wherein the support construction is formed by a lower part covering the main part of the door, and a part covering the window area of the door.

29. The door for motor vehicles as defined in claim 28, wherein on a topmost limitation of the main part of the support construction, a recess or clearance is provided for receiving a frame forming the window part of the door.

30. The door for motor vehicles as defined in claim 28, wherein the door is designed frameless within the area of the window, and a window pane is guided on a guiding profile made of plastic material and a window-sealing strip.

31. The door for motor vehicles as defined in claim 30, wherein the guiding profile is embedded in the frame of the door.

32. The door for motor vehicles as defined in claim 30, wherein the window-sealing strip is glued into the guiding profile.

33. The door for motor vehicles as defined in claim 1, wherein on a side of the inner shell of the door facing the support construction, the inner shell has an angle profile extending therearound, said profile resting against the profiled frame and being connectable thereto.

34. The door for motor vehicles as defined in claim 33, wherein the angle profile of the inner shell of the door is reinforced within the zone of connection to the profiled frame.

* * * * *